United States Patent
Barnes

(10) Patent No.: US 7,554,883 B2
(45) Date of Patent: Jun. 30, 2009

(54) FAULT FILTER FOR SEISMIC DISCONTINUITY DATA

(75) Inventor: Arthur E. Barnes, Centennial, CO (US)

(73) Assignee: Landmark Graphics Corporation, Houston, TX (US)

(*) Notice: Subject to any disclaimer, the term of this patent is extended or adjusted under 35 U.S.C. 154(b) by 798 days.

(21) Appl. No.: 11/017,450

(22) Filed: Dec. 20, 2004

(65) Prior Publication Data

US 2006/0133206 A1 Jun. 22, 2006

Related U.S. Application Data

(60) Provisional application No. 60/617,554, filed on Oct. 11, 2004.

(51) Int. Cl.
G01V 1/30 (2006.01)
G01V 1/34 (2006.01)

(52) U.S. Cl. .......................... 367/38; 702/16

(58) Field of Classification Search .................. 367/72, 367/38, 40, 41, 42; 702/16
See application file for complete search history.

(56) References Cited

U.S. PATENT DOCUMENTS

| | | | |
|---|---|---|---|
| 4,204,279 A | 5/1980 | Parrack et al. | |
| 4,403,313 A | 9/1983 | Garotta | |
| 4,984,220 A | 1/1991 | Bodine et al. | |
| 5,008,861 A | 4/1991 | Gallagher | |
| 5,148,494 A | 9/1992 | Keskes | |
| 5,260,911 A * | 11/1993 | Mason et al. | 367/57 |
| 5,563,949 A | 10/1996 | Bahorich et al. | |
| 5,838,564 A | 11/1998 | Bahorich et al. | |
| 5,892,732 A * | 4/1999 | Gersztenkorn | 367/72 |
| 5,930,730 A | 7/1999 | Marfurt et al. | |
| 5,940,778 A | 8/1999 | Marfurt et al. | |
| 6,018,498 A | 1/2000 | Neff et al. | |
| 6,032,103 A | 2/2000 | Keskes et al. | |
| 6,092,026 A | 7/2000 | Bahorich et al. | |
| 6,490,528 B2 * | 12/2002 | Cheng et al. | 702/14 |
| 6,516,274 B2 * | 2/2003 | Cheng et al. | 702/16 |
| 6,697,737 B2 * | 2/2004 | Jones et al. | 702/2 |
| 6,888,965 B1 * | 5/2005 | Rath et al. | 382/173 |
| 2002/0126896 A1 | 9/2002 | Pedersen | |
| 2003/0023383 A1 | 1/2003 | Stark | |

(Continued)

OTHER PUBLICATIONS

Gersztenkorn, et al. "Eigenstructure-based coherence computations as an aid to 3-D structural and stratigraphic mapping." Geophysics, Sep. Oct. 1999.*

(Continued)

Primary Examiner—Jack W. Keith
Assistant Examiner—Scott A Hughes
(74) Attorney, Agent, or Firm—Mark E. Scott; Conley Rose, P.C.

(57) ABSTRACT

Various methods are disclosed for identifying faults in a seismic data volume. In some method embodiments, the fault identification method comprises determining a planarity value for each of multiple positions of an analysis window in the data volume. The planarity value may be indicative of the planarity of discontinuities in the analysis window, and may be further filtered by limits on the verticality and centrality of the discontinuities. Thus a filter may be determined for suppressing relatively non-planar, relatively non-vertical, and relatively un-centered discontinuities from a discontinuity display, thereby enhancing a display of faults present in the seismic data volume.

23 Claims, 5 Drawing Sheets

U.S. PATENT DOCUMENTS

| | | | |
|---|---|---|---|
| 2003/0112704 | A1 | 6/2003 | Goff et al. |
| 2004/0181341 | A1 | 9/2004 | Neff et al. |
| 2004/0204859 | A1* | 10/2004 | Knobloch ............... 702/16 |
| 2004/0220744 | A1* | 11/2004 | Voutay et al. ............ 702/14 |

OTHER PUBLICATIONS

Marfurt, et al. "Coherency calculations in the presence of structural dip." Geophysics, Jan.-Feb. 1999.*

Nguyen, et al. "Polarization filter for multi-component seismic data."*

Roff, et al. "Joint Structures Determined by Clustering Microearthquakes Using Waveform Amplitude Ratios." Int. J. Rock. Mech. 1996.*

Al-Bin-Hassan, Nashar et. al., Fault Detection Using Hough Transforms: 73rd Annual International Meeting, Society Expl. Geophys., Expanded Asbstracts, 1995, pp. 93-96.

Ashbridge, John et al., Fault And Fracture Prediction From Coherence Data Analysis: 70th Annual International Meeting, Society Exploration Geophy., Expanded Abstracts, 2000, pp. 1564-1567.

Bahorich, M. et al., 3-D Seismic Discontinuity For Faults And Stratigraphic Features: The Coherence Cube: 65th Annual International Meeting Soc. Expl. Geophys., Expanded Abstracts, 1995, pp. 93-96.

Celis, V. et al., 2002, Selective-correlation velocity analysis, 72nd Ann. Internat. Mtg: Soc. of Expl. Geophys., pp. 2289-2292.

Chopra, S., 2001, Integrating coherence cube imaging and seismic attributes: Recorder, vol. 26, No. 12, pp. 20-22.

Cohen, I., et al., 2002, Local discontinuity measure for 3-D seismic data: Geophysics, vol. 67, pp. 1933-1945.

Duda, R.O. et al., Pattern Classification, 2nd Edition, 2001, Wiley-Interscience, pp. 114-124.

Pedersen, Stein Inge et al., "Automatic Fault Extraction Using Artificial Ants," 72nd Ann. Internat. Mtg.: Soc. Of Expl. Geophys., Expanded Abstracts, 2002, pp. 512-515.

Tingdahl, Kristofer, et al., Estimating Fault-Attribute Orientation With Gradient Analysis, Principal Component Analysis And The Localized Hough-Transform: 73rd Ann. Internat. Mtg.: Soc. Of Expl. Geophys., Expanded Abstracts, 2003, 4 pgs.

Ikonscience, "Fault X," Brochure, Jan. 2004, 2 pgs.

Geoenergy, "LFE Local Fault Extraction," online at: http://www.geoenergycorp.com/Services/automatic_fault_extraction/LFE.pdf, Dec. 2003, 1 pg.

Paradigm, "Coherence Cube Technology," online at: http://www.paradigmgeo.com/objects/pdf/Coherence_Final.pdf, Q3, 2004, 2 pgs.

Geo-Texture Technologies, "Tex-Trace," Society of Exploration Geophysicists International Exposition And Seventy-Fourth Annual Meeting, Denver, Colorado, Oct. 2004, 45 pgs.

* cited by examiner

FAULT FILTER FOR SEISMIC DISCONTINUITY DATA

BACKGROUND

Petroleum companies frequently use seismic surveys in their search for exploitable petroleum reservoirs. A seismic survey is an attempt to map the subsurface of the earth by sending sound energy down into the ground and recording the "echoes" that return from the rock layers below. The source of the down-going sound energy might come from explosions or seismic vibrators on land, and air guns in marine environments. During a seismic survey, the energy source is moved across the surface of the earth above the geologic structure of interest. Each time the source is triggered, it generates a seismic signal that travels downward through the earth and is partially reflected from boundaries between different rock types. These reflections cause sound energy waves to return toward the surface where they are detected by a set of spaced geophones or seismic energy detectors. The detectors generate electrical signals representative of the sound energy arriving at their locations.

The acoustic energy detected by the seismic detectors is generally amplified and then recorded or stored in either analog or digital form on some record medium. The recording is made as a function of time after the triggering of the source. The recorded data may be transported to a computer and displayed in the form of traces, i.e., plots of the amplitude of the reflected seismic energy as a function of time for each of the geophones or seismic energy detectors. Such displays or data may be processed to simplify the interpretation of the arriving acoustic energy at each seismic detector in terms of the subsurface layering of the earth's structure. Data from multiple explosion/recording location combinations may be combined to create a nearly continuous profile of the subsurface that may extend for many miles.

Survey types are often distinguished in terms of the pattern of recording locations on the earth's surface. As viewed from above, the recording locations may be laid out in a straight line, in which case the result is a two-dimensional (2-D) seismic survey. A 2-D survey can be thought of as a cross-sectional view (a vertical slice) of the earth formations lying underneath the line of recording locations. Alternatively, the recording locations may be laid out in a two-dimensional array pattern on the surface, in which case the result is a three-dimensional (3-D) seismic survey. A 3-D survey produces a data "cube" or volume that is, at least conceptually, a 3-D picture of the subsurface that lies beneath the survey area.

A seismic survey is composed of a very large number of individual seismic recordings or traces. In a typical 2-D survey, there will usually be several tens of thousands of traces, whereas in a 3-D survey the number of individual traces may run into the multiple millions of traces. In the past, the traces were recorded in analog form, but modern seismic traces are generally recorded in digital form. The digital samples are usually acquired at 0.004 second (4 millisecond or "ms") intervals, although 2 millisecond and 1 millisecond sampling intervals are also common. Thus, each digital sample in a seismic trace is associated with a travel time (in the case of reflected energy a two-way travel time from the surface to the reflector and back to the surface again). Further, the surface position of every trace in a seismic survey is carefully recorded and is generally made a part of the trace itself (as part of the trace header information). This allows the seismic information contained within the traces to be later correlated with specific subsurface locations, thereby providing a means for posting and contouring seismic data, and attributes extracted therefrom, on a map (i.e., "mapping"). General information pertaining to 3-D data acquisition and processing may be found in Chapter 6, pages 384-427, of Seismic Data Processing by Ozdogan Yilmaz, Society of Exploration Geophysicists, 1987, the disclosure of which is incorporated herein by reference.

The data volume in a 3-D survey is amenable to viewing in a number of different ways. First, horizontal "constant time slices" may be extracted from the seismic volume by collecting all digital samples that occur at the same travel time. This operation results in a 2-D plane of seismic data. By animating a series of 2-D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2-D seismic line from within the 3-D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, nonconformities, and sub-surface salt domes and reefs, among many others. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences. This correlation can be applied to seismic data collected over new exploration targets. In brief, seismic data provides some of the best subsurface structural and stratigraphic information that is available, short of drilling a well.

One of the most challenging tasks facing the seismic interpreter—one of the individuals within an oil company that is responsible for reviewing and analyzing the collected seismic data—is locating faults within a potentially enormous seismic volume. Faults are particularly significant geological features in petroleum exploration for a number of reasons including the following: 1) they are often associated with the formation of subsurface traps in which petroleum might accumulate, and 2) they can affect (either positively or negatively) production of nearby wells. Given the enormous amount of data collected in a 3-D volume, automated methods of enhancing the appearance of such subsurface features are sorely needed.

Various methods for enhancing the appearance of faults in seismic data have been suggested. See, for example, Goff, et al., U.S. Pub. No. 2003/0112704, Pedersen, U.S. Pub. No. 2002/0126896, Stark, U.S. Pub. No. 2003/0023383, and Neff, et al., U.S. Pat. No. 6,018,498. Such methods have given inadequate results or have proven too computationally intensive to implement. A less expensive method of enhancing the appearance of faults that provides high-quality results would prove commercially advantageous.

SUMMARY

Accordingly, there is disclosed herein various methods for identifying faults in a seismic data volume. In some method embodiments, the fault identification method comprises determining a planarity value for each of multiple positions of an analysis window in the data volume. The planarity value may be indicative of the planarity of discontinuities in the analysis window, and may be further filtered by limits on the verticality and centrality of the discontinuities. Thus a filter may be determined for suppressing relatively non-planar, relatively non-vertical, and relatively un-centered discontinuities from a discontinuity display, thereby enhancing a display of faults present in the seismic data volume.

BRIEF DESCRIPTION OF THE DRAWINGS

A better understanding of the present invention can be obtained when the following detailed description is considered in conjunction with the following drawings, in which like items are shown with the same reference numbers and.

Figure 1:
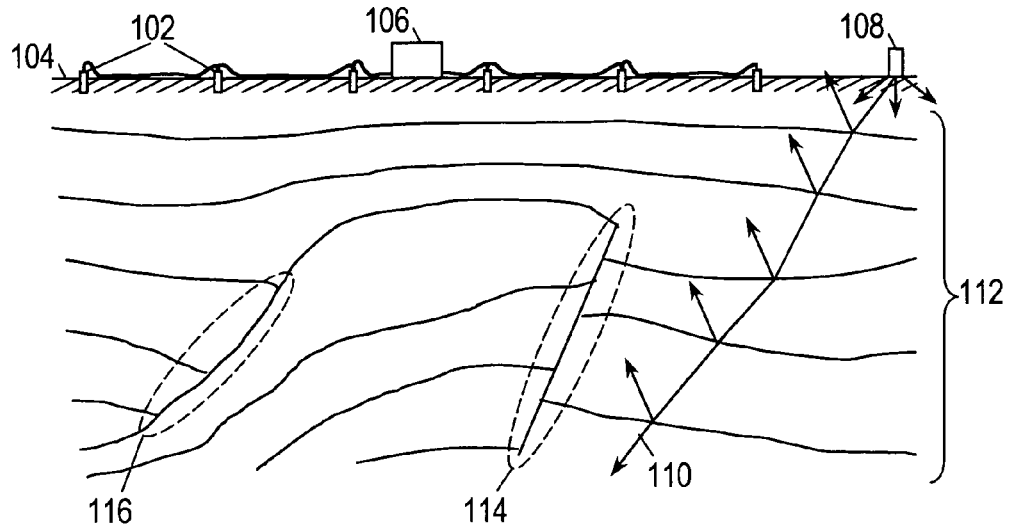
FIG. 1 shows an illustrative environment for obtaining a seismic survey.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Disclosed herein are systems and methods for filtering seismic discontinuity data to enhance those features in the discontinuity data that have the geometrical characteristics of a fault. Faults tend to be more planar and more steeply dipping than other causes of seismic discontinuity, which provides the basis for methods of filtering 3-D seismic discontinuity data to enhance the appearance of faults and suppress other sources of discontinuity. In various embodiments, filtering is done within a small 3-D window to find the plane that best fits the discontinuity data in a least-squares sense. If this plane is determined to be planar enough, vertical enough, and central enough, then the discontinuity value at the center of the window may be passed as being due to a fault; otherwise it may be rejected. The result is filtered discontinuity data, i.e., fault data, with better-defined faults than in the non-filtered discontinuity data. Alternatively, the calculated filter itself may provide the desired identification of fault positions.

Seismic data is derived from seismic surveys, which may be obtained as shown in FIG. 1. FIG. 1 shows a set of seismic energy detectors 102 positioned in a spaced-apart arrangement on the earth's surface 104. The detectors 102 are coupled to a recording unit 106 that records the data collected by the detectors. A seismic energy source 108 is triggered to generate sound waves that propagate into the earth as shown by the arrows emanating from source 108. One of the arrows 110 has been extended into the earth to show the path of a particular portion of the sound waves. At each boundary between differently composed layers 112 of the earth, the sound wave is partly reflected and partly refracted (transmitted) as shown. The detectors 102 receive the reflected seismic waves and convert them into electrical signals for storage by recording unit 106.

The source 108 may be repeatedly triggered at different locations relative to the array of detectors 102. The traces from multiple firings may be recorded separately and later combined to screen out random noise and undesirable interference caused by secondary echoes of reflected waves. The data may then be processed to identify the features of the subsurface layers 112. Features of particular interest may include faults (e.g., fault 114) and other sudden changes (e.g., layer termination 116) in the layers.

Figure 2:
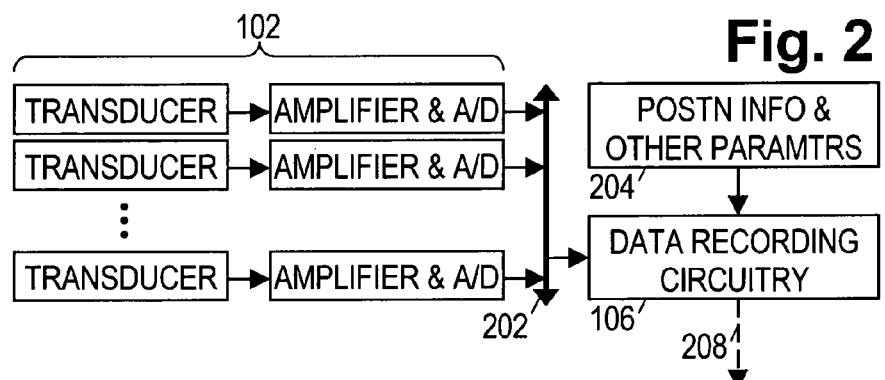
FIG. 2 shows a block diagram of an illustrative seismic surveying system.

FIG. 2 shows an illustrative block diagram of seismic survey system electronics. The detectors 102 include transducers to convert the seismic wave energy into electric signals, and may further include electronics to filter, amplify, and convert the electric signals into digital data. The digital data may be communicated to the recording unit 106 via a bus 202, or alternatively may be communicated via a dedicated information pathway or via a wireless connection. The recording unit 106 stores the digital data on an information storage medium, along with position information for each of the detectors and any other parameters that may be useful in interpreting the stored data. The location information and other parameters may be provided via an independent interface 204 such as a user interface that allows manual entry of such information.

Recording unit 106 may use any suitable information storage medium. Due to the large volume of information to be stored, the information storage medium is generally some form of magnetic medium, e.g., disk drives or magnetic tape. However, the information storage medium may also be optical media or integrated circuit memories, though the associated cost may be somewhat higher. In an alternative embodiment, recording unit 106 simply gathers the data from the detectors and transmits the data in real time to a remote location such as a central storage facility.

The data collected by recording unit 106 may be communicated to a general purpose digital data processing system 206. The communication may take place in any of various ways, including transmission via a wired or wireless communications link, and by physical transport of an information storage medium. System 206 may process the traces to combine information from multiple firings and to apply corrections to the traces for such effects as wave propagation delays. Re-sampling of the data may be performed to obtain evenly spaced, time- or depth-synchronized samples on each of the traces, and to obtain estimated traces at interpolated positions within the detector array. The trace data may also be converted into any number of seismic attribute measurements including without limitation phase, peak amplitude, sound velocity, acoustic impedance, rock porosity, water saturation, and hydrocarbon content.

Figure 3:
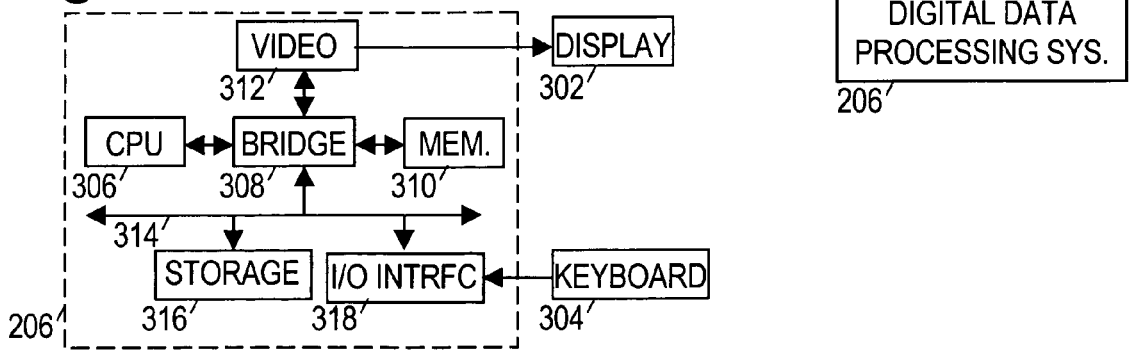
FIG. 3 shows a block diagram of illustrative digital equipment for processing and displaying seismic data.

FIG. 3 shows a block diagram of an illustrative digital data processing system 206. To interact with a user, system 206 may be coupled to a text or graphical display 302, and to an input device 304. Display 302 and input device 304 may together operate as an interface between the user and system 206. That is, system 206 may perform certain actions prompted by user actuation of input device 304 and provide the user with a response via display 302.

System 206 may include a central processing unit (CPU) 306 that is coupled by a bridge 308 to a system memory 310. CPU 306 may also be coupled by bridge 308 to a video card 312 that in turn couples to display 302. CPU 306 may be further coupled by bridge 308 to an expansion bus 314. Also coupled to the expansion bus 314 may be a storage device 316 and an input/output interface 318. Input device 304 may be coupled to system 206 via input/output interface 318.

CPU 306 may operate in accordance with software stored in memory 310 and/or storage device 316. Under the direction of the software, the CPU 306 may accept commands from an operator via a keyboard or some alternative input device 304, and may display desired information to the operator via display 302 or some alternative output device. CPU 306 may control the operations of other system components to retrieve, transfer, process, and store data.

Bridge 308 coordinates the flow of data between components. Bridge 308 may provide dedicated, high-bandwidth, point-to-point buses for CPU 306, memory 310, and video card 312. In systems having alternative architectures, the bridge 308 may be omitted and the communications between the CPU 306 and all the other system components may occur via bus 314.

Memory 310 may store software and data for rapid access. On the other hand, storage device 316 may store software and data for long-term preservation. Storage device 316 may be portable, may accept removable media, may be an installed component, or may be a integrated component on a main system circuit board. Storage device 316 may also be a removable memory device such as a memory card. In addition, alternatives for storage device 316 may include a non-volatile integrated memory, a magnetic media storage device, an optical media storage device, or some other form of long-term information storage.

Video card 312 may provide customized processing for graphics, along with data conversion from a memory-based format to a signal format suitable for display 302. Display 302 may provide data in a visual format for use by an operator. For example, display 302 may show a two dimensional maps or vertical slices of seismic data, discontinuity data, and fault data as described below with reference to FIGS. 11 and 12. Alternatively, display 302 may show a three dimensional volume of seismic data, discontinuity data, and fault data, by providing a perspective view and/or by animating a two-dimensional image to illustrate data variation as a function of position.

Expansion bus 314 may support communications between bridge 308 and multiple other computer components. Bus 314 may couple to removable modular components and/or components integrated onto a circuit board with bridge 308 (e.g., audio cards, network interfaces, data acquisition modules, modems). In systems that include a network interface, the CPU 306 may access software and data via a network, thereby making it possible for system 206 to use information storage and processing resources external to system 206.

Input/output interface 318 may support communications with legacy components and devices not requiring a high-bandwidth connection. Interface 318 is coupled to input device 304, which may provide data to interface 318 in response to operator actuation. Input device 304 may be a keyboard or some other input device (e.g., pointing devices, buttons, sensors). Multiple input devices may be concurrently coupled to input/output interface 318 to provide data in response to operator actuation. Output devices (e.g., parallel ports, serial ports, printers, speakers, lights) may also be coupled to input/output interface 318 to communicate information to the operator.

In the current context, system 206 may be configured with software that processes seismic discontinuity data to remove discontinuities that do not have the characteristics of a fault. The software may be stored in storage device 316, and some or all of the software may be copied into memory 310 as needed for use by CPU 306. CPU 306 may retrieve the software instructions a few at a time from memory 310, and follow the procedures laid out by the software instructions to achieve the desired filtering of the discontinuity data. These procedures may include opportunities for interaction with a user of system 206, such as displaying fields that allow a user to identify the seismic data file to be operated on, or displaying controls that allow a user to alter processing parameters and change display characteristics. The procedures disclosed herein allow system 206 to generate views of the filtered seismic discontinuity data, and allow system 206 to provide these views to a user via display 302. The system may interact with the user, allowing the user to specify data subregions for closer examination and faster processing. Indeed, the user may be allowed to specify a shape, position, and orientation of the subregion that is to be displayed to the user. In some embodiments, the rendering of this subregion is performed in real-time so that the user perceives the computer's operations as virtually instantaneous (e.g., processing occurs at 10 frames per second or more).

Figure 4:
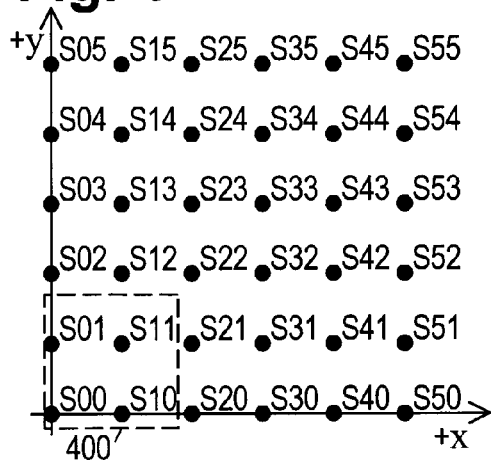
FIG. 4 shows an illustrative layout of seismic energy detectors as seen from above.
Figure 5:
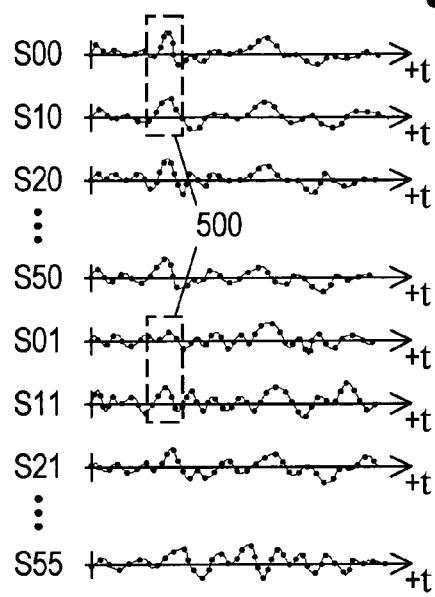
FIG. 5 shows examples of traces recorded by the seismic energy detectors of FIG. 4.

FIGS. 4 and 5 taken together illustrate one form of seismic data that may be processed in accordance with the procedures disclosed herein. FIG. 4 shows an illustrative arrangement of seismic detectors as the arrangement might appear from above. The arrangement in FIG. 4 has 36 detectors distributed in an evenly-spaced 6×6 grid and labeled Sxy, where x is the coordinate along the x axis and y is the coordinate along the y axis. The illustrative arrangement is small and well-ordered solely to aid in understanding the procedures explained below. While an evenly spaced grid arrangement may provide advantages in terms of the resolution and ease of data processing, the disclosed procedures have no inherent requirement for such a regular arrangement.

FIG. 5 shows data traces associated with each of the seismic detectors of FIG. 4. These data traces are shown as a function of time, but could also be provided as a function of depth. The data traces are shown as continuous curves, but may be provided as a sequence of digital samples as indicated by the dots on the curves. Inasmuch as a value is desired between available samples, interpolation may be used to obtain the desired value.

Thus, the seismic data may be provided as a series of data traces, each trace being associated with a seismic energy detector having a specified location. The traces may be provided as ordered pairs of time (or depth) and attribute value. If the trace samples are equally spaced, the time (or depth) portion may be dropped and the data provided as a sequence of attribute values. These attribute values may represent any suitable characteristic derived from the seismic energy measurements of the detectors. A discontinuity measurement procedure may be applied to calculate discontinuity measurements based on seismic data in groups of traces. Examples of discontinuity measurement procedures are described in Barnes, patent application Ser. No. 10/608,734, Bahorich et al., U.S. Pat. No. 5,563,949, Gersztenkom, U.S. Pat. No. 5,892,732, and Marfurt et al., U.S. Pat. No. 5,940,778. Fault filtering procedures such as those described herein may then be applied to the resulting discontinuity data to remove discontinuities that do not have the requisite characteristics of a fault.

Figure 6:
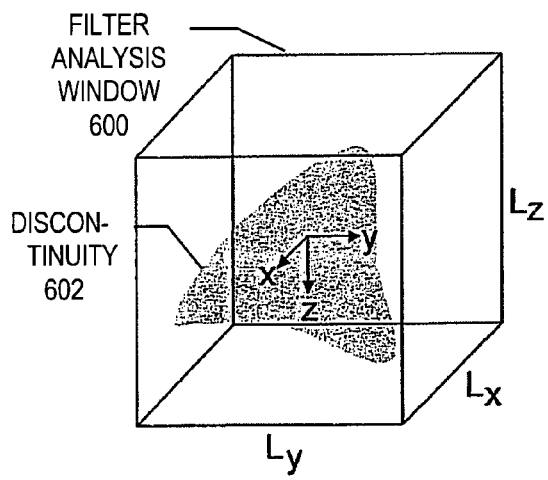
FIG. 6 shows an illustrative filter analysis window with a surface-like discontinuity in the analysis window.

The fault filtering procedures disclosed herein calculate whether faults exist at points in the discontinuity data by examining the discontinuity attribute data in fault analysis windows about those points. FIG. 6 shows an illustrative filter analysis window 600 with dimensions $L_x$, $L_y$, and $L_z$. The x and y axes for the window are horizontal, and the z (or time t) axis points downward. Window 600 has a horizontal extent and a vertical extent which may be represented by rectangles 400 and 500 (shown in FIGS. 4 and 5). The filter analysis window selects a small portion of the discontinuity data for application of the filtering criteria. In certain procedure embodiments, the filter analysis window is systematically moved from position to position until all discontinuity data has been included in the window at least once. In certain other procedure embodiments, the filter analysis window moves within an interactively-defined subregion of the data, which may be interactively positioned by a user at only those positions of interest for fast processing and examination. Fault filtering calculations may then be performed for each filter analysis window position in the seismic data set (or alternatively, for only positions within the interactively defined subregion).

An analysis window, when applied to the available discontinuity data volume, excludes the bulk of the data and presents a small subset of the data for analysis. The analysis window may have various shapes and various degrees of "fuzziness" for distinguishing between excluded data and presented data. In three dimensions, the window's shape may be spherical or polyhedral (e.g., a tetrahedron, a cube, and an octahedron), but the shape is not necessarily scaled equally in all dimensions. In two dimensions, the window's shape may be circular or a polygon (e.g., triangular, rectangular, pentagonal), but again, the shape is not necessarily scaled equally in all dimensions. Processing may be most efficient in window shapes with orthogonal sides (i.e., rectangles, cubes).

The fuzziness of the window used is determined by a window filter. The classic "rectangular" filter (not to be confused with windows having a rectangular shape) offers a minimal degree of fuzziness, in that all data within the extent of the window is considered with equal emphasis and all data outside the window is wholly ignored. Though easy to understand and use, the rectangular window characteristic can cause analysis anomalies directly attributable to the sudden discontinuity at the edges of the window. Accordingly, other window types have been developed to fully consider data near the center of the window and to de-emphasize the rest of the data as a function of its distance from the window's center. Many de-emphasis functions have been tried and may prove suitable for use, including triangular functions, raised-cosine functions, Hamming and Hanning windows. (Hamming windows may be preferred.) The chosen de-emphasis function is of course applied in three dimensions for a three-dimensional window.

A discontinuity is determined to be fault-like if the discontinuity data within the filtering window forms a plane that meets filtering criteria described herein. The filtering calculations use three cascaded filters that pass relatively centered vertical planar features and suppress all other features within a filter analysis window. In various embodiments, the fault filtering procedure begins by determining the planarity of discontinuity data in a fault analysis window.

A best-fitting plane for discontinuity data 602 may be found using principal component analysis (PCA). The filtering process begins with a scaling of the window so that the window is of equal dimension along the x, y, and z axes. A covariance matrix C is then calculated. The matrix elements, $C_{xx}$, $C_{xy}$, etc. are the data covariances along the x, y, and z axes within the filter analysis window 600. The covariance matrix C shows how the discontinuity data in the filter analysis window 600 is dispersed around its "center of gravity". This matrix may have the form $$C = \begin{bmatrix} C_{xx} & C_{xy} & C_{xz} \\ C_{yx} & C_{yy} & C_{yz} \\ C_{zx} & C_{zy} & C_{zz} \end{bmatrix} \quad (1)$$

The variance of the discontinuity data α along the x axis, $C_{xx}$, may be defined as $$C_{xx} = \frac{1}{A} \sum_w \alpha(x - \bar{x})^2 \quad (2)$$

Here $$\sum_w$$

refers to summation over the entire filter analysis window 600, A is the total discontinuity in the discontinuity data α, $$A = \sum_w \alpha, \quad (3)$$

and $\bar{x}$ is the average x location of the discontinuity data α, $$\bar{x} = \frac{1}{A} \sum_w \alpha x \quad (4)$$

Variances Cyy and Czz and averages $\bar{y}$ and $\bar{z}$ may be determined in the same way. The covariance of the x and y locations of the data, $C_{xy}$ or $C_{yx}$, is given by $$C_{xy} = C_{yx} = \frac{1}{A} \sum_w \alpha(x - \bar{x})(y - \bar{y}) \quad (5)$$

The other covariances may be similarly defined.

Next, the covariance matrix C is processed to find its three eigenvalues, $\lambda_1$, $\lambda_2$, and $\lambda_3$, and the corresponding three orthonormal unit eigenvectors, $e_1$, $e_2$, and $e_3$. The eigenvalues are arranged such that $\lambda_1 \geq \lambda_2 \geq \lambda_3$. The first two eigenvalues, $\lambda_1$ and $\lambda_2$, quantify data variances along directions represented by the corresponding eigenvectors, which also serve to define a plane best-fitting the discontinuity data 602. The third eigenvalue, $\lambda_3$, quantifies the data variance perpendicular to the best-fitting plane. For planar data, the magnitude of $\lambda_3$, is small relative to the magnitudes of $\lambda_1$ and $\lambda_2$, and for nonplanar data it is comparable in magnitude. Eigenvectors $e_1$ and $e_2$ lie within the plane 602 while eigenvector $e_3$ is normal to it.

The next steps in the filtering process operate on the eigenvalues and eigenvectors to determine whether the discontinuity 602 is sufficiently planar, vertical, and central to be passed as indicative of a fault. The fault filtering function F may be defined as the product of three independent constituent filters $f_p(\Lambda_3)$ (planarity filter), $f_v(z_3)$ (verticality filter), and $f_c(r)$ (centrality filter):

$$F = f_p(\Lambda_3) \cdot f_v(z_3) \cdot f_c(r) \tag{6}$$

The fault filtering function F may be applied to the discontinuity data in the filter analysis window 600 either by multiplying these data with the filter values or by replacing them with the filter values. Optionally, the filter function may implement a threshold to reject small values in the discontinuity data to improve the results.

Figure 9:
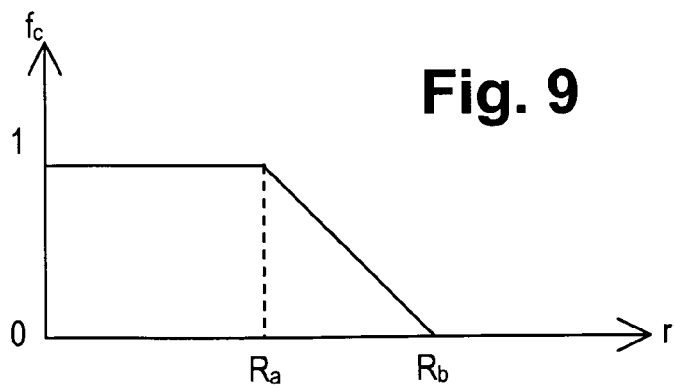
FIG. 9 shows one possible design for a centrality filter.

Some possible derivations of these constituent filters are presented below. One of ordinary skill in the art will appreciate that the ordering of the three constituent filters in the function F is not important. These constituent filters may be designed as nonlinear operators that return 1 if a fault-like characteristic is present, 0 if the characteristic is absent, and an intermediate value where a fault may be present. FIG. 9 illustrates one design that the filter $f_c(r)$ could have. The horizontal axis represents a centrality measurement, while the vertical axis represents the corresponding filter value. Distances $R_a$ and $R_b$ may be set to predetermined fractions of the trace spacing. The filters $f_p(\Lambda_3)$ and $f_v(z_3)$ may be designed similarly.

The constituent filter that passes planar features, $f_p(\Lambda_3)$, may be defined as a function of the magnitude of the third eigenvalue $\lambda_3$ relative to the first and second eigenvalues $\lambda_1$, and $\lambda_2$. As previously stated, the first two eigenvalues represent data variances within a best-fitting plane, and the third eigenvalue represents the variance of the data perpendicular to the plane. These eigenvalues provide a measure for how planar the discontinuity data is. If the magnitude of the third eigenvalue is small relative to the magnitudes of the other two eigenvalues, the data is relatively planar; if the three magnitudes are all approximately the same, the data is not relatively planar. Thus, a ratio $\Lambda_3 = 2\lambda_3/\lambda_1 + \lambda_2$ may be defined, which varies from 0 for perfectly planar data to 1 for nonplanar data. Alternatively, the ratio $\Lambda_3$ may be defined as $3\lambda_3/\lambda_1 + \lambda_2 + \lambda_3$, which varies similarly. Therefore, a suitable filter for passing planar features may be $\Lambda_3$, or some function thereof as expressed by $f_p(\Lambda_3)$.

Figure 7:
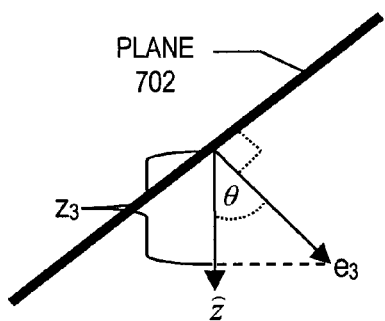
FIG. 7 illustrates a verticality calculation for a plane.

The constituent filter that passes relatively vertical planes, $f_v(z_3)$, may be defined as a function of the third eigenvector's z component, $z_3$. As previously stated, the first two eigenvectors define the best-fitting plane for the discontinuity data in the filter analysis window, and the third eigenvector is normal to this plane. As illustrated in FIG. 7, the verticalness of the plane is inversely related to the z component, $z_3$, of the third eigenvector $e_3$. The eigenvector is a unit vector, so if the z component reaches its maximum magnitude of 1, the plane is perfectly horizontal. Conversely, if the $z_3$ component reaches its minimum magnitude of 0, the plane is perfectly vertical. Therefore, a suitable filter for passing the verticality of the plane 602 may be $z_3$, or some function thereof as expressed by $f_v(z_3)$.

Figure 8:
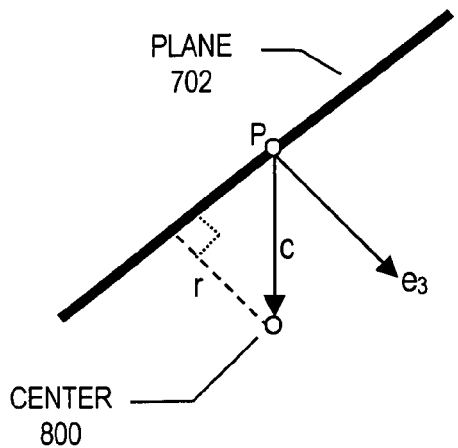
FIG. 8 illustrates a centrality calculation for a plane.

The constituent filter that passes only those planes relatively central to the filter analysis window, $f_c(r)$, may be defined as a function of the perpendicular distance r from the plane to the window's center. The best-fitting plane will pass through the discontinuity data's "center of gravity", $[\bar{x}, \bar{y}, \bar{z}]$, which was calculated in the covariance matrix determination. As illustrated in FIG. 8, to find r, let the point P be the center of gravity for the discontinuity data within the filter analysis window 600, and let c be the vector from P to the window's center 800. The distance from the plane to the window's center 800, r, equals the absolute value of the dot product of the vector c and the third eigenvector $e_3$:

$$r = |c \cdot e_3| \tag{7}$$

Clearly, the smaller the value of r, the closer the plane is to the window center 800. Therefore, a suitable filter for passing the centrality of the plane may be the inverse of r, or some other function thereof as expressed as $f_c(r)$. A suitable piece-wise linear function is shown in FIG. 9, and the other constituent functions may be similarly constructed with a rejection region (where the function is 0), a pass region (where the function is 1), and a transition region (where the function varies linearly from 0 to 1).

In an alternative embodiment, the constituent filter for centrality may simply operate on vector c, the distance between the discontinuity data's center of gravity and the center of the window. In this alternative embodiment, the orientation of the plane does not affect the centrality determination.

The fault filter of equation (6) may be augmented by a discontinuity threshold filter $f_t(A)$, resulting in:

$$F = f_p(\Lambda_3) \cdot f_v(z_3) \cdot f_c(r) \cdot f_t(A) \tag{8}$$

As with the other constituent filters, the discontinuity threshold filter ranges between 0 and 1. The threshold filter may be designed to eliminate regions where the discontinuity values are low, and pass only data in those regions having a significant amount of discontinuity. As with the other constituent filters, the threshold filter characteristic may include a rejection region, a pass region, and a transition region between the other two regions.

Figure 10:
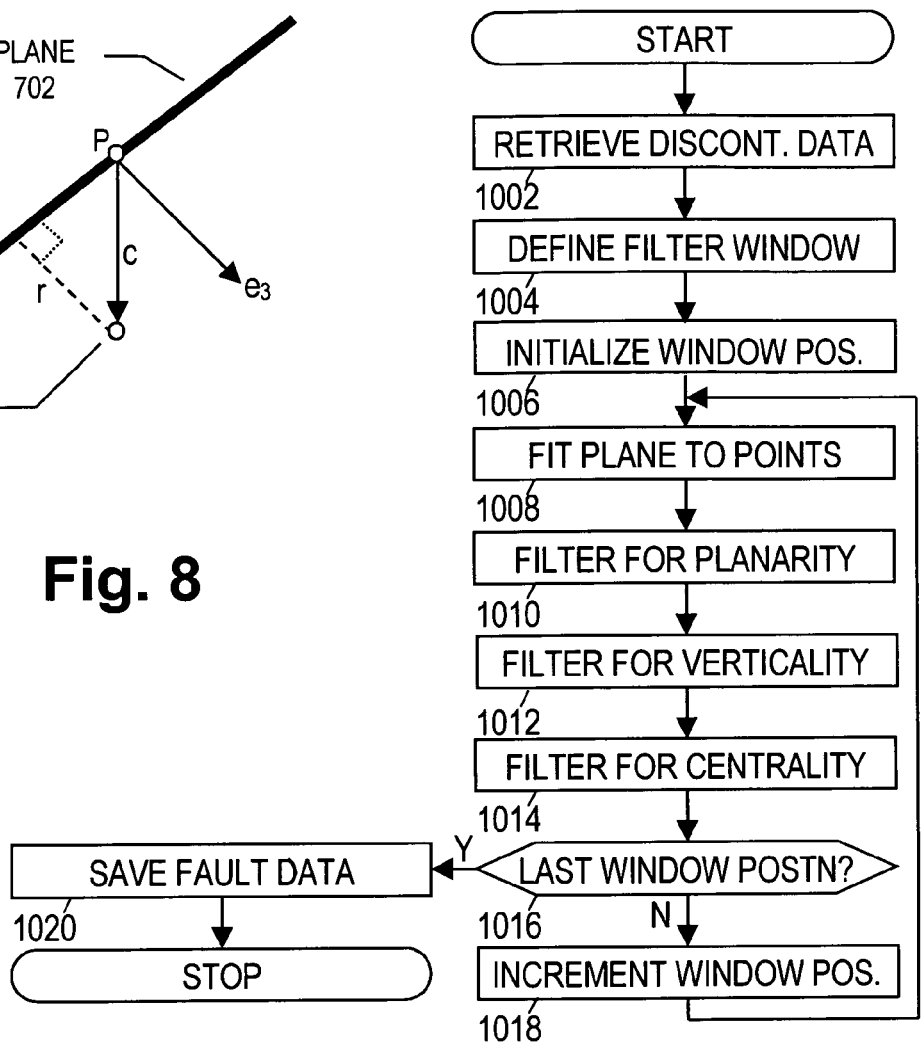
FIG. 10 shows a flowchart illustrative of various embodiments of the present invention.

FIG. 10 shows a flowchart that is illustrative of a fault filtering procedure that may be carried out by system 206. While it is expected that the procedure will be implemented in the form of software, it is also contemplated that application-specific hardware implementations may be used. The form of the flowchart is chosen to aid understanding of the methods disclosed herein. It should be recognized, however, that the actual implementation may differ markedly due to the use of concurrent operations, multiple threads, and object oriented programs. Even where the method is implemented using discrete, sequential steps, these steps may be implemented in a different order than that shown without departing from the scope of the claims.

Beginning in block 1002, system 206 retrieves at least some of the discontinuity data for processing. In block 1004, the system determines the size and shape of the filter analysis window to be used. This determination may be based on a default rule or stored parameter, or alternatively may be specified by an operator in response to a query from system 206. At this time, the system 206 may further determine limits on the data to be processed, e.g., the size of the discontinuity data set. Other limits may be specified including horizons or other 3D contours in the data set.

Having determined a filter analysis window and any limits on the filter calculations (if applicable), system 206 determines an initial filter analysis window position in block 1006. In block 1008, system 206 finds the eigenvalues and eigenvectors of the covariance matrix for the discontinuity data in the filter analysis window. In blocks 1010-1014, system 206 applies the filters for planarity, verticality, and centrality of the plane in accordance with previously disclosed techniques.

In block 1016, system 206 determines whether the filtering process has been performed for the last filter analysis window position. If not, then in block 1018 system 206 increments the filter analysis window position and returns to block 1008 to perform the next filter application. Otherwise, in block 1020 system 206 stores the filtered data as fault data. System 206 may further display the fault data to an operator, possibly in the map format shown in FIGS. 11 and 12.

Figure 11:
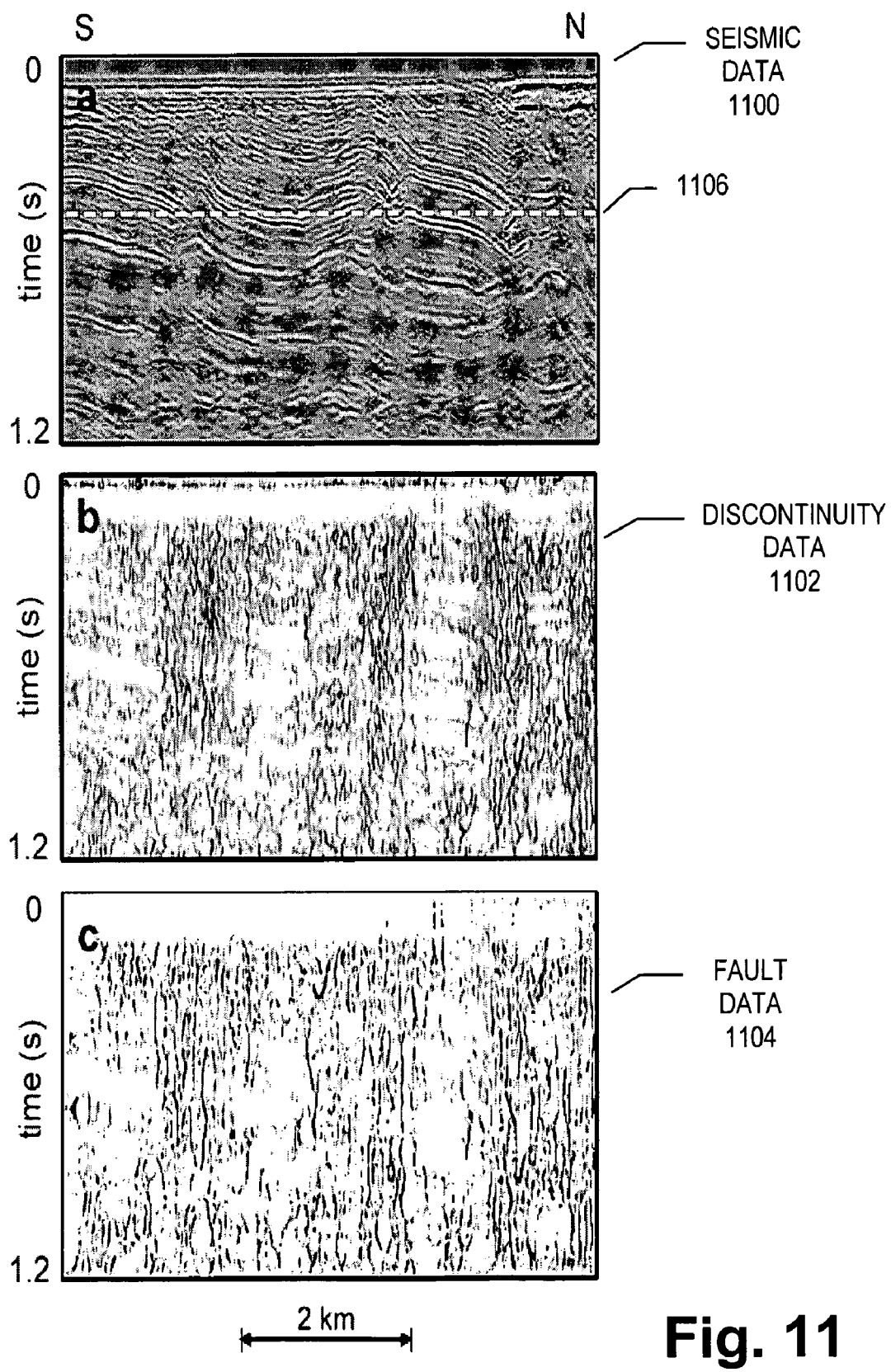
FIGS. 11A-11C show vertical slices of a seismic data volume at various processing stages.
Figure 12:
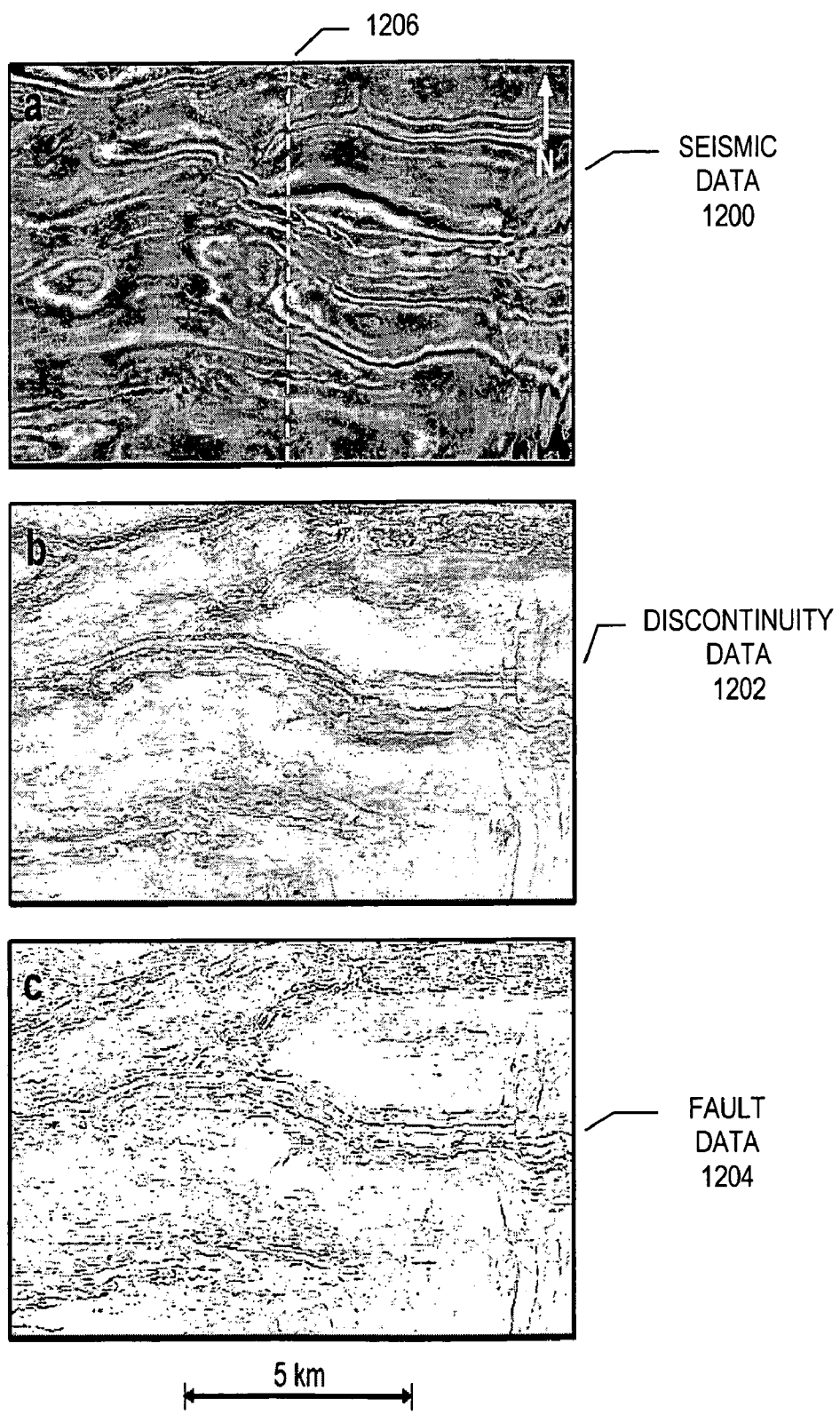
FIGS. 12A-12C show time slices of a seismic data volume at various processing stages.

FIGS. 11 and 12 present comparisons of seismic data, the discontinuity data resulting from application of a discontinuity measurement procedure to the seismic data, and the fault data resulting from application of a fault filter to the discontinuity data. FIGS. 11A-11C show the three data views for a vertical slice of the data volume. FIG. 11A shows seismic data 1100. Various rock strata are clearly visible, but evidence of any faults is all but invisible. (Line 1106 indicates where the horizontal view of FIG. 12 intersects this vertical view).

FIG. 11B shows discontinuity data 1102 generated in accordance with the methods described in Barnes, U.S. patent application Ser. No. 10/608,734. (Other suitable discontinuity measurement methods may alternatively be used.) Faults are much more clearly visible in this view. However, other discontinuities are also present and may tend to obscure the faults that are being sought.

FIG. 11C shows the fault data 1104 generated by a fault filter. The filter analysis window used to generate the fault data comprises 7 lines by 7 traces by 17 time samples. The fault-like discontinuities appear clearly, while other discontinuities have been suppressed. This view may be considered very desirable by explorationists to aid them in deciding the best exploitation strategy for petroleum reservoirs.

FIG. 12A shows a horizontal slice 1200 of the seismic data volume. (Line 1206 indicates where the vertical view of FIG. 11 intersects with this view.) Again, the evidence of any faults is difficult to discern. FIG. 12B shows the discontinuity data 1202, which shows faults but also shows other sources of discontinuity which may tend to obscure the faults. FIG. 12C shows the fault data 1204, where fault-like discontinuities are clearly delineated while other sources of discontinuity are suppressed.

In the foregoing description, the fault filter was applied to discontinuity data. However, the fault filter may also be suitable for use with other forms of seismic data, including dip or curvature attribute data. Such data may be emphasized where it exhibits relatively vertical, planar characteristics, and may be suppressed elsewhere.

Numerous variations and modifications will become apparent to those skilled in the art once the above disclosure is fully appreciated. For example, the seismic data may be presented in any form suitable for representing information regarding an area or volume of the earth. In addition, the above explanation described a three-dimensional implementation, but the disclosed methods are readily applicable to two-dimensions as well. It is intended that the following claims be interpreted to embrace all such variations and modifications.

What is claimed is:

1. A fault identification method that comprises:
    obtaining seismic data produced from a seismic survey of an earth formation;
    for each of multiple positions of an analysis window in the seismic data,
    determining a planarity value for discontinuities in the analysis window; and based on the determining displaying an indication of faults of the earth formation.

2. The method of claim 1, wherein said determining a planarity value comprises:
    determining a covariance matrix for discontinuity data in the analysis window;
    finding eigenvalues for the covariance matrix; and
    calculating a ratio between a smallest of the eigenvalues and an eigenvalue average.

3. The method of claim 2, further comprising:
    for each of multiple positions of an analysis window in the seismic data,
    determining a planarity filter value from the planarity value using a planarity function that ranges from zero to one.

4. The method of claim 3, wherein the planarity function has a rejection region where the planarity function is approximately zero, a pass region where the planarity function is approximately one, and a transition region between the rejection region and the pass region.

5. The method of claim 4, wherein the planarity function is linear in the transition region.

6. The method of claim 1, wherein the method further comprises:
    for each of multiple positions of the analysis window in the seismic data, determining a verticality value for discontinuity data in the analysis window.

7. The method of claim 6, wherein said determining a verticality value comprises:
    determining a covariance matrix for the discontinuity data in the analysis window;
    finding eigenvalues and eigenvectors for the covariance matrix; and
    finding a vertical component of an eigenvector corresponding to a smallest eigenvalue.

8. The method of claim 7, further comprising:
    for each of multiple positions of an analysis window in the seismic data,
    determining a verticality filter value from the verticality value using a verticality function that ranges from zero to one.

9. The method of claim 8, wherein the verticality function has a rejection region where the verticality function is approximately zero, a pass region where the verticality function is approximately one, and a transition region between the rejection region and the pass region.

10. The method of claim 9, wherein the verticality function is linear in the transition region.

11. The method of claim 6, further comprising:
    for each of multiple positions of the analysis window in the seismic data,
    determining a fault filter value from at least the planarity value and the verticality value.

12. The method of claim 11, wherein the fault filter values are restricted to a range between zero and one, the larger values being indicative of relatively vertical and relatively planar discontinuity data in the analysis window.

13. The method of claim 1, wherein the method further comprises:
    for each of multiple positions of the analysis window in the seismic data,
    determining a centrality value for discontinuity data in the analysis window.

14. The method of claim 13, wherein said determining a centrality value comprises:
    determining a center of discontinuity within the analysis window; and
    determining a position vector between the center of discontinuity and a center of the analysis window.

15. The method of claim 14, wherein said determining a centrality value further comprises:
- determining a covariance matrix for discontinuity data in the analysis window;
- finding eigenvalues and eigenvectors for the covariance matrix; and
- finding an inner product between the position vector and an eigenvector corresponding to a smallest eigenvalue.

16. The method of claim 14, further comprising:
- for each of multiple positions of an analysis window in the seismic data,
- determining a centrality filter value from the centrality value using a centrality function that ranges from zero to one.

17. The method of claim 16, wherein the centrality function has a rejection region where the centrality function is approximately zero, a pass region where the centrality function is approximately one, and a linear transition region between the rejection region and the pass region.

18. The method of claim 1, wherein said determining is performed in real time in response to a user's interactive selection of a data subregion.

19. A fault identification method that comprises:
- determining discontinuity values from seismic data, the seismic data produced from a seismic survey of an earth formation;
- applying principal component analysis to the discontinuity values to identify faults; and
- displaying identified faults.

20. The method of claim 19, wherein displaying further comprises:
- displaying identified faults in a time-slice view or a horizontal slice view.

21. The method of claim 19, wherein displaying further comprises:
- displaying identified faults in a vertical slice view.

22. The method of claim 19, wherein displaying further comprises:
- displaying identified faults in a three dimensional view.

23. The method of claim 19, further comprising:
- applying a threshold filter to the discontinuity values to eliminate discontinuities below a programmable threshold.

* * * * *